June 23, 1970 — PIERRE-HENRI GALLAY — 3,516,118

BLOW EXTRUSION APPARATUS

Filed Aug. 2, 1967 — 2 Sheets-Sheet 1

Inventor
Pierre-Henri Gallay
By Cushman, Darby & Cushman
Attorneys

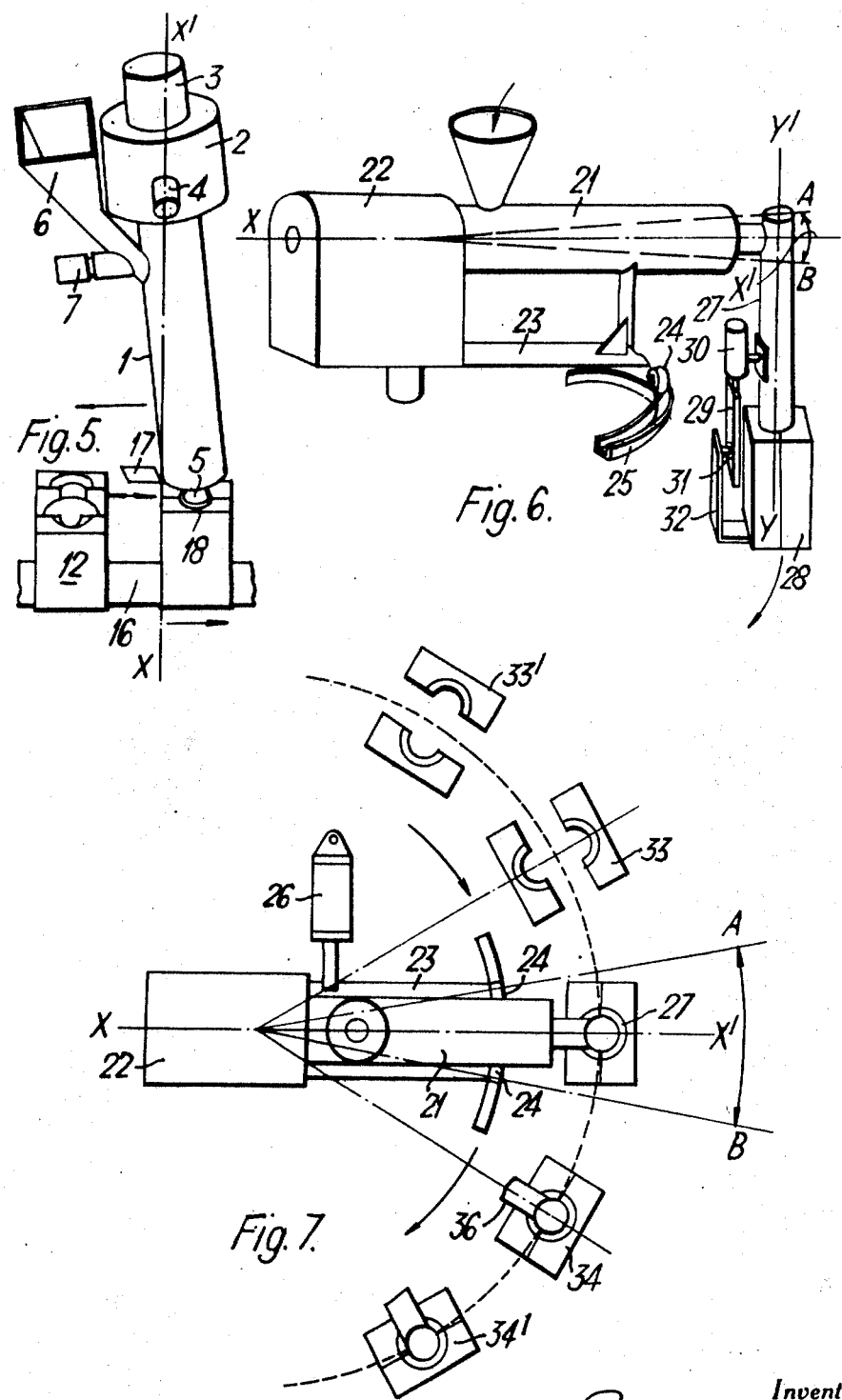

United States Patent Office 3,516,118
Patented June 23, 1970

3,516,118
BLOW EXTRUSION APPARATUS
Pierre-Henri Gallay, Neuilly-sur-Seine, France, assignor to Mecaplast S.A., Geneva, Switzerland, a Swiss body corporate
Filed Aug. 2, 1967, Ser. No. 657,809
Claims priority, application France, Aug. 4, 1966, 72,155
Int. Cl. B29c 17/07; B29d 23/03
U.S. Cl. 18—5
6 Claims

ABSTRACT OF THE DISCLOSURE

The disclosure relates to a blow extrusion apparatus in which a parison is extruded into a blowing mould, the extrusion head being moveable along a path corresponding in part to the path of movement of the moulds, which may be moved on a straight path and the extruder oscillate about a horizontal axis above the moulds, whereby the extrusion head contacts one of the moulds for a short period. Alternatively the moulds are on a rotary table and the extruder rotates through a small angle with its head in contact with a mould.

---

In blow-extrusion processes for forming hollow bodies from thermoplastics materials, the formation of the tubular parison at the outlet of an extruder influences the duration of the operational cycle; furthermore, if the method of working is continuous, employing a series of moulds, the cycle of movement of the latter is frequently required to provide a standstill period under the extrusion nozzle, which corresponds to the enclosure of the mould on the parison, the severing thereof and the disengagement from the mould.

In practice, in order to avoid these standstill periods, various operational methods are used, and among these mention may be made in particular of the displacement of the mould during the formation of the tubular parison, either continuously so as to obtain hollow bodies in series, or with severing at the die, in which case the moulds undergo a vertical withdrawal movement in such manner as to disengage the space necessary for the following parison. The parison is then removed by means of gripper members which transfer it to the moulds. However, the removal of the parison prevents auxiliary operations being carried out on the closed mould before the severing of the parison, such as pre-blowing or shaping operations or operations for forming the neck of the container, in particular when the latter is formed with a wide aperture, so as to avoid the collapse or deformation of the parison, since these hinder the blowing operation effected by means of a nozzle at the head of the mould.

According to the invention there is provided an extruder for the continuous blow extrusion of hollow bodies in moulds which are displaced along a given path, in which the extruder is moveable and mounted in such a manner as to follow a path corresponding at least in part to the path of movement of the associated moulds.

This arrangement permits a continuous movement of the mould support, chain or turntable, and greatly simplifies the mechanical mounting thereof; furthermore, it reduces wear of the members and the difficulty inherent in the synchronism of the operations.

In a particular embodiment, the extruder may be mounted vertically and for oscillation about a horizontal pivot.

In a further embodiment, the extruder may be mounted for pivoting about a vertical axis and the head and the extrusion died or nozzle are mounted vertically at the end of the extruder.

This arrangement, which is particularly suitable for a blow-extrusion installation having moulds mounted on a turntable has the advantage that it ensures satisfactory positioning of the die on the mould, but it involves a relatively high degree of inertia and a certain assembly complexity.

In order that the invention may more readily be understood, the following description is given, merely by way of example, reference being made to the accompanying drawing, in which:

FIGS. 3, 4 and 5 are front views corresponding to three main phases of the extrusion process utilizing the extruder of FIGS. 1 and 2;

FIG. 6 is a schematic side elevation of a second embodiment of extruder according to the invention; and FIG. 7 is a plan view of the extruder shown in FIG. 6, as utilized for extrusion into moulds mounted on a turntable.

Figure 1:
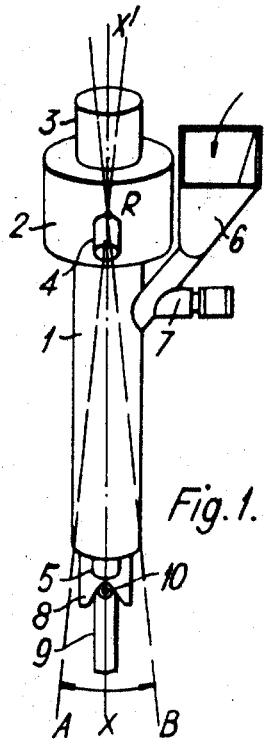
FIG. 1 is a front view of one embodiment of extruder according to the invention.
Figure 2:
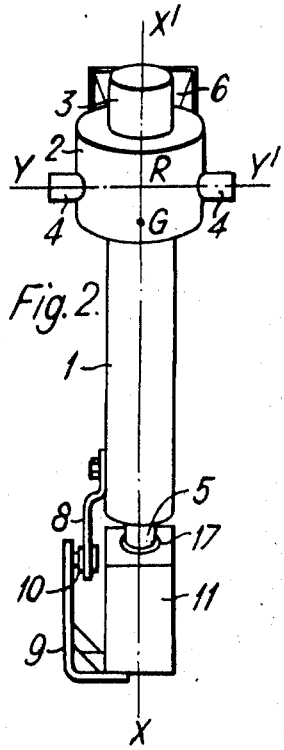
FIG. 2 is a scale elevation of the extruder shown in FIG. 1.

In the embodiment shown in FIGS. 1 to 5, the extruder comprises a vertical casing 1 enclosing an extrusion screw driven by a driving head 2 and a motor 3, which may for example be a hydraulic motor.

The assembly is mounted for pivoting about the horizontal pivot 4 located above the centre of gravity of the assembly and at a distance therefrom which is preferably selected in such manner that it corresponds to the intrinsic oscillation frequency of the pendular arrangement constituting the assembly.

The extrusion die 5 is fed by the funnel 6 provided with a device 7 which is intended to facilitate the downward travel of the material, for example a vibration device or a rotating rod device which may, if appropriate, have a helical profile.

The oscillating movements of the extruder, between the end positions determined by the speed of movement of the moulds and the rhythm of their travel under the die 5, are controlled by a device (not shown), which may for example be a mechanical or penumatic device, such as a double-acting jack or a cam having a roller and a transmission rod acting on the extruder head above or below the pivot 4.

On the lower portion of the extruder body there is secured a fork 8, which engages a roller 10 mounted on the support 9 of the mould 11 so as temporarily to locate the extruder assembly with respect to the said mould 11. The fork 8 has a profile designed in shch manner that it engages the roller 10 when the extruder is in the position shown in FIG. 3 at the commencement of operation and is disengaged therefrom at the end of operation so as to free the mould 11.

Figure 3:
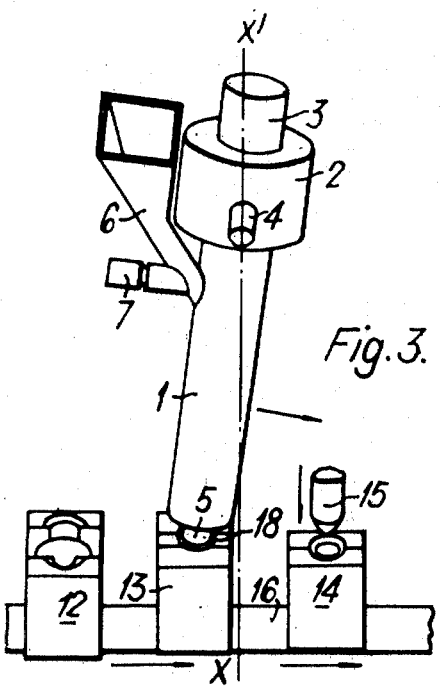

In operation, as illustrated in FIG. 3, the moulds 12, 13 and 14, disposed on a chain 16, are arranged so that the mould 13 is in position under the die 5, the mould 12 is open and empty and ready for the next operation, the mould 14, filled and closed, is about to receive the blowing nozzle 15. The mould 13 arrives open under the extruder 1, the die of which is accurately located by elements 8 and 10 above the aperture 18 in the mould 13. The extruder is then inclined towards the left relatively to the vertical axis X–X' and the chain of moulds advances continuously from left to right and the extruder accompanies the mould in its displacement, the mould 13 being shown in FIG. 3 at the instant at which it commences to close.

Figure 4:
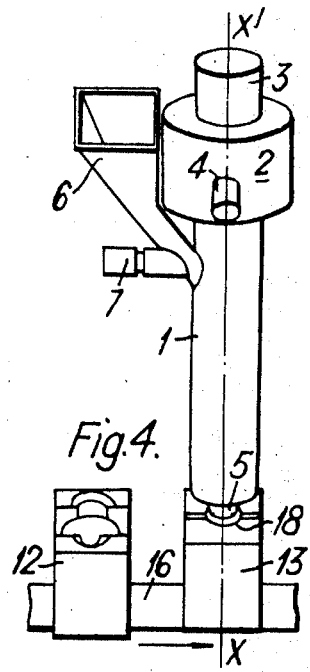

In FIG. 4 the mould 13 is closed almost completely and the extruder has rocked to the vertical position. This mould may alternatively be already closed so as to permit complementary operation with severing of the parison, for example pre-blowing, or any mechanical or other operation.

In FIG. 5 the mould is closed, the knife 17 is about to cut the parison, and the fork 8 disengages from the roller 10. The extruder will then oscillate in the opposite direction, towards the left, and a new parison will be formed during this oscillation and the mould 12 occupy the position of the mould 13 as in FIG. 3, for the new cycle.

In the embodiment shown in FIGS. 6 and 7, the assembly of the extruder 21 is mounted on a vertical axis and is able to pivot through a given angle A–B about the said pivot, being guided by a rigid element 23 carrying rollers 24 which run on the rail 25. The displacement of the extruder is controlled by a jack 26.

An extrusion head 27 is mounted vertically at the end of the body 21 of the extruder. The head 27 may be locked on the mould 28 by means of a fork 29 which is moved by a jack 30 and which co-operates with a roller 31 secured on the plate 22 connected to the mould 28.

Five moulds 33', 33, 28, 34 and 34', out of twelve moulds mounted on a turntable along a circular path 35, are illustrated in FIG. 7. The turntable moves in the direction of the arrow.

The moulds 33, 33' are shown as closing and when a mould arrives under the extrusion head 27 it closes and is located with respect to the head 27 by the fork 29 and roller 31. The extruder then accompanies the mould 28 over a portion of its travel and then the mould, in its positions 34, 34', is disengaged from the extrusion die and receives the blowing nozzle 36. The same operations are then reproduced for a new cycle.

If desired, the pivoting extruder could be mounted on a double pivot at 90°, in the manner of a cardan joint.

I claim:
1. An apparatus for the successive blow-extrusion of hollow bodies, each in a mould, said apparatus comprising, in combination:

(a) a plurality of moulds;
(b) means for displacing said moulds along a given path of movement;
(c) an extruder;
(d) an extrusion head on said extruder; and
(e) means for movably mounting the whole of said extruder, whereby said extrusion head of said extruder describes a path which at least temporarily follows the path of movement of said mould.

2. An apparatus according to claim 1 in which said moulds are mounted for movement along a substantially straight path of movement, and the extruder is mounted substantially vertically above said path of movement, effective to permit said extruder to oscillate about a horizontal axis.

3. An apparatus according to claim 1 in which said moulds are mounted on a rotary table for rotation about a vertical axis, said extruder is mounted for limited rotation about said axis, and said extruder is provided with a vertically disposed extrusion head and extrusion die at a location directly above one of said moulds on said rotary table.

4. An apparatus according to claim 1 in which said means for displacing said moulds along a path of movement is synchronised with means for moving said extruder along said corresponding path.

5. An apparatus according to claim 4 wherein said moving means comprises a fluid operated jack.

6. An apparatus according to claim 1 wherein cooperating locating means are provided on said extruder and said moulds.

References Cited

UNITED STATES PATENTS

| | | | |
|---|---|---|---|
| 2,858,564 | 11/1958 | Sherman et al. | 18—5 X |
| 3,396,427 | 8/1968 | Raspante | 18—5 |

WILBUR L. McBAY, Primary Examiner